United States Patent
Itoh et al.

(10) Patent No.: US 6,382,393 B2
(45) Date of Patent: May 7, 2002

(54) CONVEYANCE-DIRECTION SWITCHING DEVICE IN A ROLLER CONVEYOR

(75) Inventors: Kazuo Itoh, Kasai; Tatsuhiko Nakamura, Hyogo; Tomonobu Hasegawa, Nishiwaki, all of (JP)

(73) Assignee: Itoh Electric Co., Ltd., Hyogo (JP)

( * ) Notice: Subject to any disclaimer, the term of this patent is extended or adjusted under 35 U.S.C. 154(b) by 0 days.

(21) Appl. No.: 09/738,738

(22) Filed: Dec. 15, 2000

(51) Int. Cl.$^7$ ............................................... B65G 47/10
(52) U.S. Cl. ................................................ 198/370.09
(58) Field of Search ..................... 198/370.09, 370.03, 198/370.1, 371.3, 370.01

(56) References Cited

U.S. PATENT DOCUMENTS 4,509,636 A * 4/1985 Godbois ................ 198/370.09
4,962,841 A * 10/1990 Kloosterhouse ........ 198/370.09

* cited by examiner

Primary Examiner—James R. Bidwell
(74) Attorney, Agent, or Firm—Koda & Androlia

(57) ABSTRACT

A roller conveyor that carries objects in a certain direction comprising, underneath a drive roller that is rotationally driven, transverse rollers each which has a rotation axis intersecting with the drive shaft and is raised and lowered. The transverse rollers are raised and lowered by being provided, for instance, in a lift, and they are arranged so that, when the transverse rollers are in the raised position, their peripheries come into contact with the drive roller. In this position, the uppermost edges of the transverse rollers are located higher than the uppermost edge of the drive roller, so that the transverse rollers divert objects carried on the conveyor transversely.

4 Claims, 5 Drawing Sheets

CONVEYANCE-DIRECTION SWITCHING DEVICE IN A ROLLER CONVEYOR

BACKGROUND OF THE INVENTION

1. Field of the Invention

The present invention relates to a conveyance-direction switching device in a roller conveyor that conveys objects in a certain direction by means of rotationally driven drive rollers including those with built-in motors, capable of shifting the carried objects transversely with respect to the roller conveyor.

2. Prior Art

A device for switching the conveyance directions of objects to be carried on a roller conveyor is necessary for sorting objects, etc. at distribution centers, etc. Commonly used methods for switching conveyance directions include those arranging two conveyors in a fork (in the shape of Y) and using a diverging device to switch the conveyance directions, as well as those employing a pusher that intersects with the conveyance direction to forcibly divert certain objects transversely.

All of these conventional conveyance-direction switching devices require a separate driving means for switching the conveyance direction. Accordingly, such conveyance-direction switching devices are generally complicated and expensive and are not easily installed in an existing conveyor device.

BRIEF SUMMARY OF THE INVENTION

The object of the present invention is to overcome the disadvantages of such conventional techniques and to provide a simple structured conveyance-direction switching device used in a roller conveyor that requires no special driving means.

In order to achieve the objects of the present invention, below a rotationally driven drive roller, transverse rollers having rotation axes that intersect wit the rotationally driven drive roller so that the transverse rollers are raised and lowered freely are provided. When the transverse rollers are in the raised position, they come into partial contact with the drive roller and are rotated. At this time, the uppermost edges of the transverse rollers project above the uppermost edge of we chive roller. With this arrangement, the torque of the drive rolls is transmitted to the transverse rollers, and the objects that are conveyed are diverted transversely by the torque of the drive roller.

Transmission of the torque of the drive roller to the transverse rollers can be achieved by arranging the rotation axes of the drive roller and transverse rollers in such a way that they intersect with each other at an angle other than right angles. With this arrangement, some portions of the drive roller come into contact with some points on the peripheral surfaces of the transverse rollers. The frictional forces at these contact points rotationally drive the transverse rollers.

In order to allow the transverse rollers to divert the objects carried by the drive rollers in an orthogonal direction, auxiliary rollers are used. Each auxiliary roller is paired with a transverse roller and is arranged so as to make contact with the radial side of the end face, preferably near the periphery, of the transverse roller. In this structure, the transverse rollers are arranged in the direction that intersects with the drive roller at right angles. The transverse rollers are raised and lowered; and when they are in the raised position, the auxiliary rollers come into contact with the drive roller. In this way, the torque of the drive roller is transmitted to the auxiliary rollers, and the torque of the auxiliary rollers is transmitted to the transverse rollers.

Preferably, the transverse rollers are provided at several positions along the drive roller in order to achieve smooth transverse diversion. It is also preferable that several drive rollers are equipped with transverse rollers, forming a transverse conveyor having a certain width. So as to realize such a conveyance-direction switching device equipped with many transverse rollers, transverse rollers are provided at several positions in a lift, and the lift is raised and lowered so that the transverse rollers provided at the several positions come into contact with different drive rollers and are rotated by the drive rollers.

DETAILED DESCRIPTION OF THE INVENTION

Embodiments of the conveyance-direction switching device used in a roller conveyor according to the present invention will now be described in detail with reference to the accompanying drawings.

Generally, a roller conveyor includes several rollers arranged on a flat plane. All or some of the rollers are rotationally driven. The rotationally driven rollers are called drive rollers 1, and it is these drive rollers 1 that move the objects on the conveyor in a certain direction. The drive roller 1 may have a built-in motor, but it may also be driven by a separate motor or by another power source via a chain or a belt. If only some of the rollers that constitute the roller conveyor are used as drive rollers, then the rollers other than the drive rollers are idle rollers.

Figure 1:
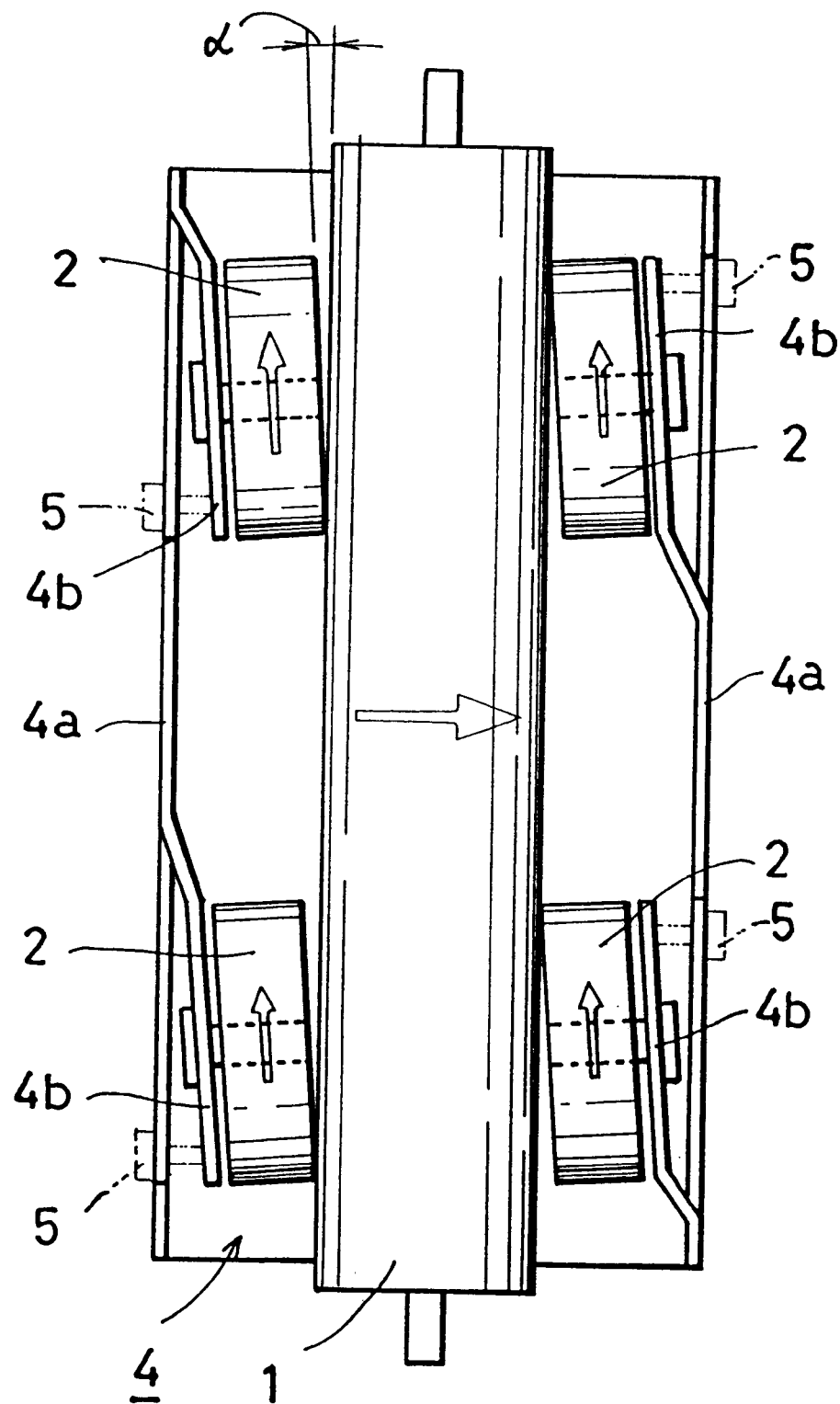
FIG. 1 is a plan view showing an embodiment of the conveyance-direction switching device used in a roller conveyor of the present invention.
Figure 2:
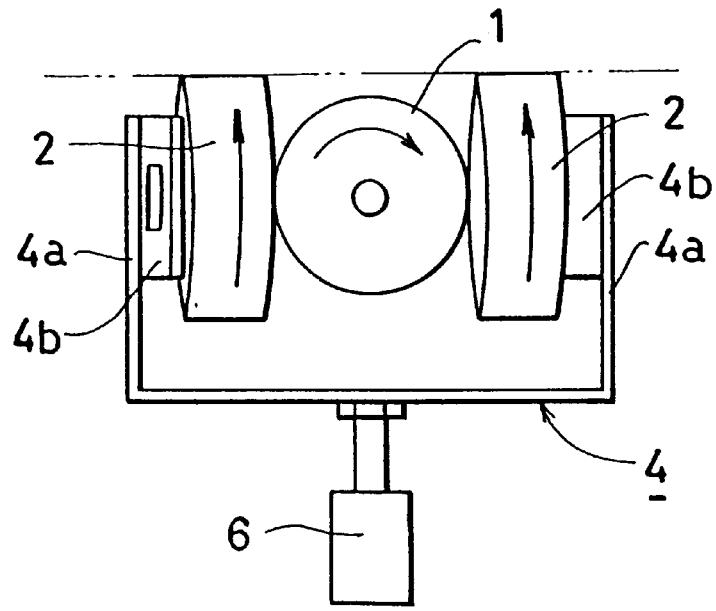
FIG. 2 is a front view of the conveyance-direction switching device of FIG. 1 showing the condition in which the transverse rollers are raised.
Figure 3:
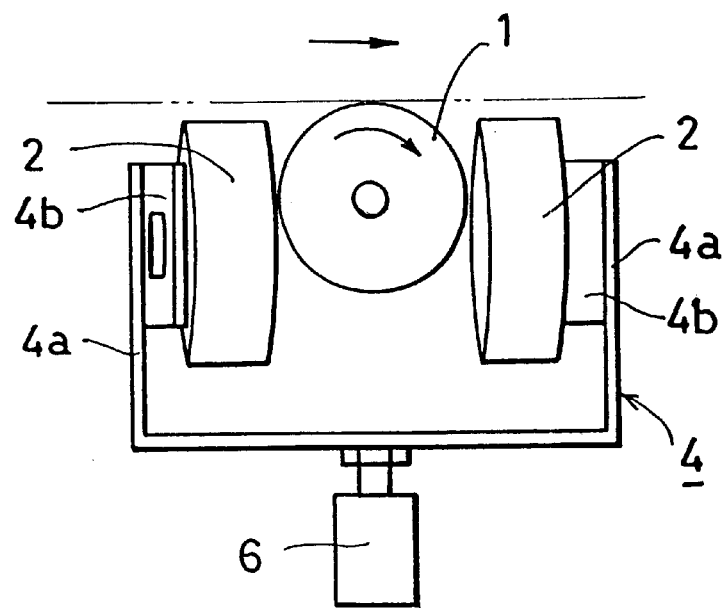
FIG. 3 is a front view of the conveyance-direction switching device of FIG. 1 showing the condition in which the transverse rollers are lowered.

FIG. 1 is a plan view showing an example of a conveyance-direction switching device established for a drive roller 1. In the embodiment shown in FIG. 1, a total of four transverse rollers 2 are provided on the left and right sides of the drive roller 1. Two of them are at one position and the other two are at another position along the rotation axis of the drive roller 1. In this embodiment, the transverse roller 2 is short and has a diameter larger than that of the drive roller 1. Four transverse rollers 2 are mounted on a lift 4; and as shown in FIGS. 2 and 3, the lift 4 is raised and lowered by the cylinder 6 so that all transverse rollers are raised and lowered under the same conditions. For raising and lowering the lift 4, a link mechanism or other lifting means may be used.

FIG. 2 shows the lift 4 that is raised. In this condition, portions of the drive roller 1 are in contact with portions of the transverse rollers 2. In other words, the left and right edges of the drive roller at its horizontal position are in contact with portions of the end faces of the transverse rollers, or more specifically, with the ends of the portions that horizontally run through the centers of the transverse rollers. In the condition shown in FIG. 1, the torque or the rotation of the drive roller 1 is transmitted to the transverse rollers 2, while the uppermost edges of the transverse rollers 2 are raised above the uppermost edge of the drive roller 1. In this situation, the uppermost edges of the transverse rollers indicated by the two-dot chain lines work as a conveyance plane that transversely diverts the objects carried by the drive roller.

FIG. 3 shows the lift 4 which is lowered by the cylinder 6. In this lowered position, because the transverse rollers 2 are released from contact with the drive roller 1, the transverse rollers are not rotated. At this time, because the uppermost edges of the transverse rollers 2 are positioned below the uppermost edge of the drive roller 1, the carried objects are conveyed in accordance with the rotational direction of the drive roller 1, i.e., in the direction indicated by the arrow in FIG. 3.

If the transverse rollers 2 are positioned perpendicular to the drive roller 1, the drive roller makes contact with both left and right sides of each transverse roller with respect to the center of the transverse roller. In this condition, the same amount of torque is applied to the left and right sides of the transverse roller, balancing the clockwise turning force and the counterclockwise turning force. In this condition, the transverse rollers 2 are not rotated at all. In the embodiment shown in FIG. 1, the transverse rollers 2 are offset from the direction that perpendicularly crosses that of the drive roller by an angle of α. With this arrangement, the drive roller 1 makes contact with each transverse roller at one point, supplying it with sufficient torque. The angle α as shown in FIG. 1 is rather large; but in the actual device, it can be a relatively small angle.

To mount transverse rollers 2 on the lift 4, the side walls 4a of the lift 4 are partly raised to form mounts 4b as shown in FIG. 1, and the transverse rollers 2 are mounted on the mounts 4b. The tips of the mounts 4b are preferably designed to press the transverse rollers 2 against the drive roller 1 by means of pressing bolts 5, as indicated by the two-dot chain line in FIG. 1, coil springs (not shown), leaf springs (not shown) or the elasticity of the mounts 4b themselves. In this way, the torque of the drive roller 1 is transmitted to the transverse rollers 2 more reliably.

Figure 4:
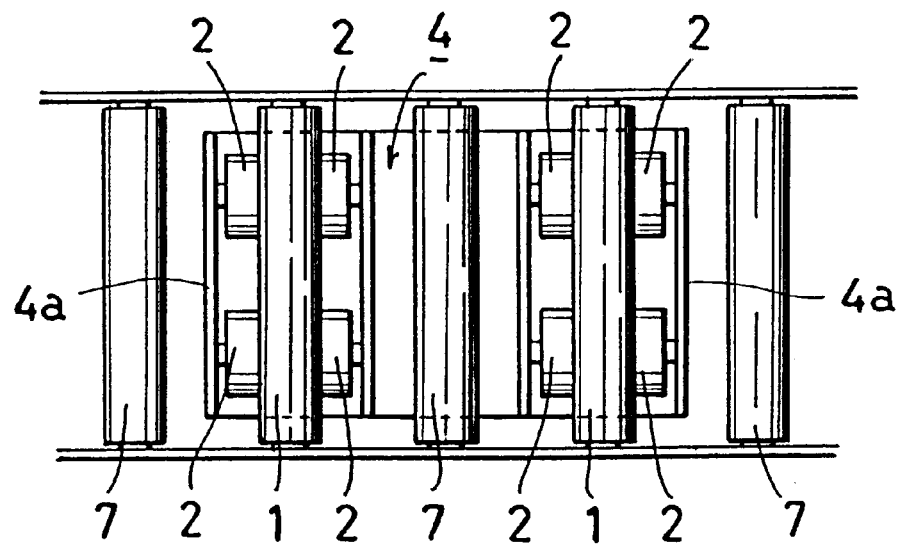
FIG. 4 is a plan view showing an embodiment of a conveyance-direction switching device in which transverse rollers that are rotationally driven by contacting two drive rollers sandwiching one idle roller are established on a lift.
Figure 5:
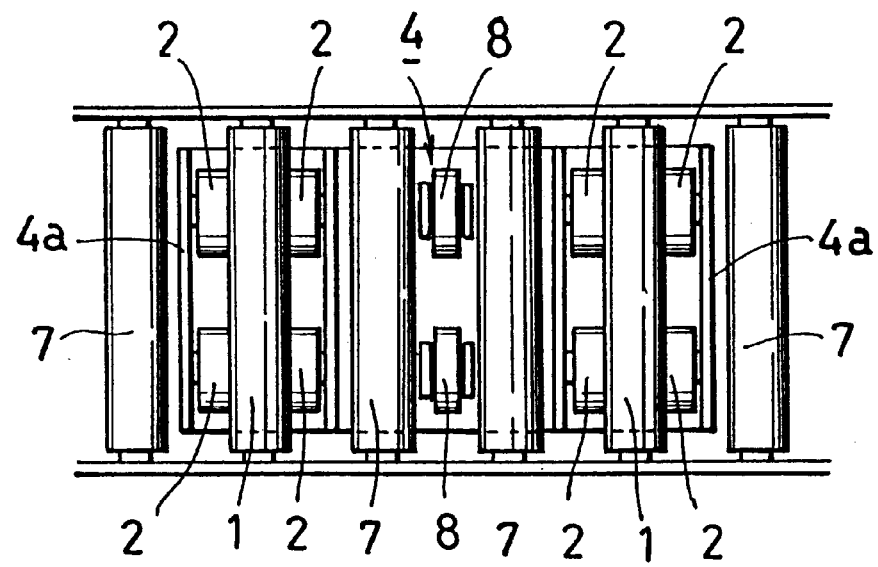
FIG. 5 is a plan view showing an embodiment of a conveyance-direction switching device in which transverse rollers that are rotationally driven through contact with two drive rollers sandwiching two idle rollers are established on a lift.

FIGS. 4 and 5 are schematic plan views of embodiments in which transverse rollers that come into contact with several drive rollers mounted on a lift 4. In these drawings, the transverse rollers are mounted at right angles to the drive rollers for the sake of convenience. In the embodiment shown in FIG. 4, the drive rollers 1 and idle rollers 7 are arranged one after another so that each idle roller 7 is sandwiched between two dive rollers 1 each of which is in contact with four transverse rollers 2 so as to constitute a conveyance-switching device.

More specifically, the lift 4 is provided below the idle roller 7 and the two drive rollers 1. The four transverse rollers 2 are mounted on the lift 4 below the two drive rollers. When the lift 4 is raised, all of the transverse rollers 2 come into contact with the drive rollers 1; when the lift 4 is lowered, all of the transverse rollers 2 are detached from the drive rollers 1.

In the embodiment shown in FIG. 5, two idle rollers 7 are provided between two drive rollers 1. Below the two idle rollers, a lift 4 is provided, on which four transverse rollers 2 are arranged below the two drive rollers. When the lift 4 is raised, all of the transverse rollers 2 come into contact with the drive rollers 1; when the lift 4 is lowered, all of the transverse rollers 2 are separated from the drive rollers 1. Between the two idle rollers 7 are transverse idle rollers 8. The transverse idle rollers 8 have the same diameter as the transverse rollers 2 and are mounted in a rotatable fashion.

Figure 6:
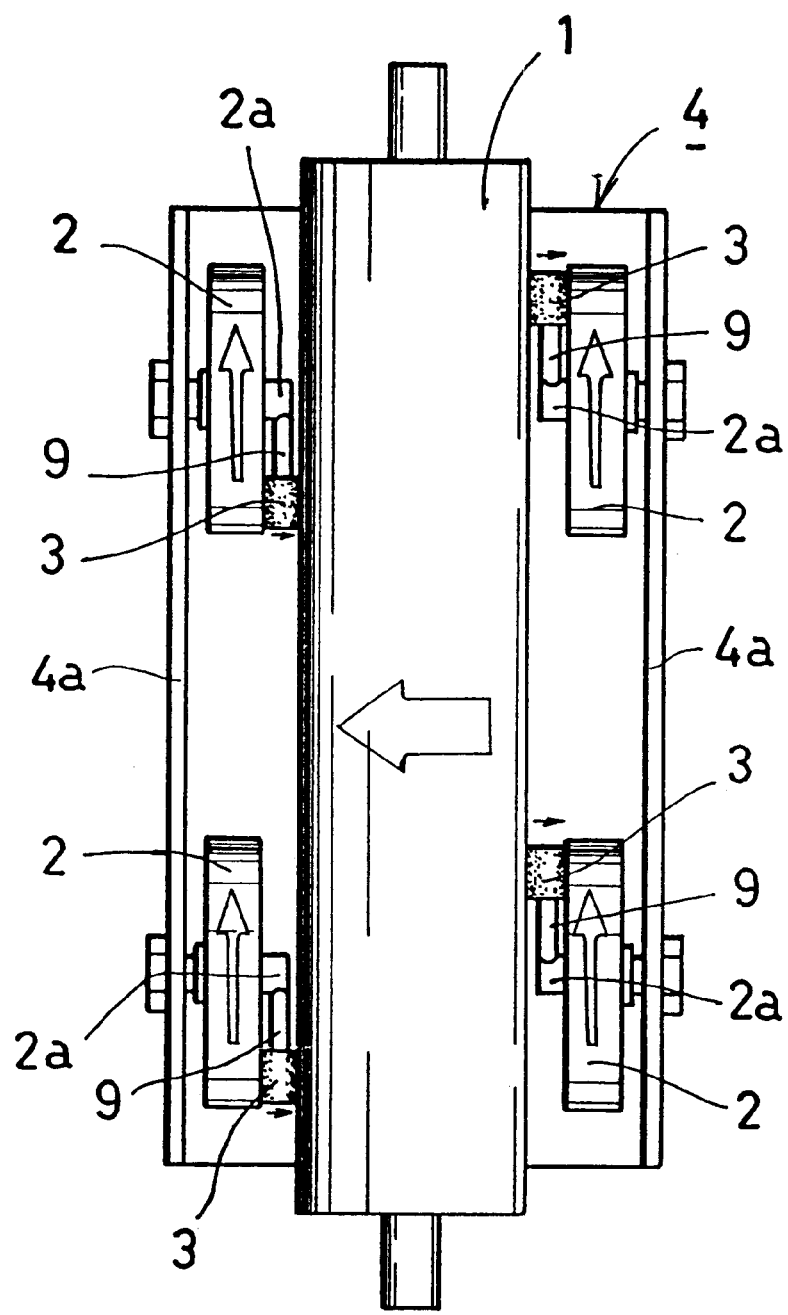
FIG. 6 is a plan view showing an embodiment of a conveyance-direction switching device in a roller conveyor of the present invention, in which auxiliary rollers are used.

To accurately change the conveyance direction by 90 degrees, an auxiliary roller 3 is employed. The auxiliary roller 3 is provided between each transverse roller 2 and the drive roller 1 as shown in FIG. 6. In the embodiment shown in FIG. 6, transverse rollers 2 are mounted on the lift 4 via support shafts 2a that are fastened to the side walls 4a of the lift 4. From the tips of these support shafts 2a, horizontal auxiliary arms 9 extend so as to axially support the auxiliary rollers 3 at the tips of the auxiliary arms 9.

Figure 7:
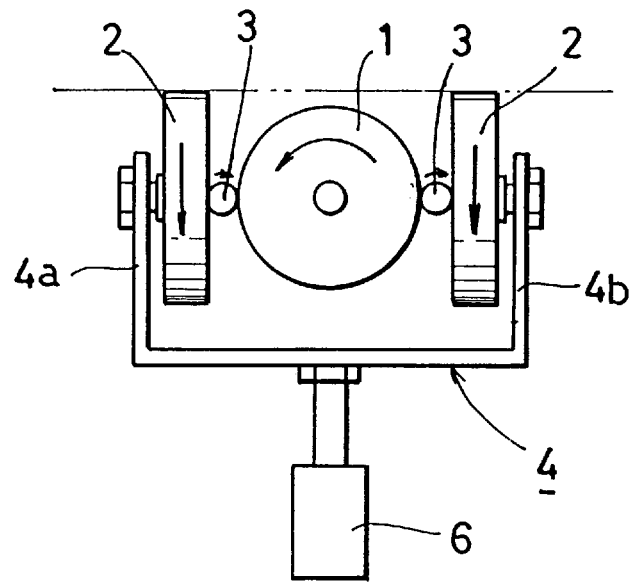
FIG. 7 is a front view of the conveyance-direction switching device of FIG. 6, in which the transverse rollers are raised.

The auxiliary rollers 3 fitted to the tips of the auxiliary arms 9 remain constantly in contact with the periphery of the transverse rollers 2. These auxiliary rollers 3 are raised together with the transverse rollers to make contact with the drive roller 1 as shown in FIG. 7. In the condition shown in FIG. 7, the lift 4 equipped with the horizontal rollers is raised by the cylinder 6. In this condition, the drive roller 1 is rotationally driven in the direction indicated by the arrow, and the auxiliary rollers 3 make contact with the periphery of the drive roller 1 on both (left and right) sides. At the same time, the transverse rollers 2 that are in contact with the auxiliary rollers 3 are rotationally driven by the auxiliary rollers 3. When the transverse rollers 2 are thus rotated, the uppermost edges of the transverse rollers are positioned above the uppermost edges of the drive rollers, so the objects carried by the roller conveyor are diverted transversely.

Figure 8:
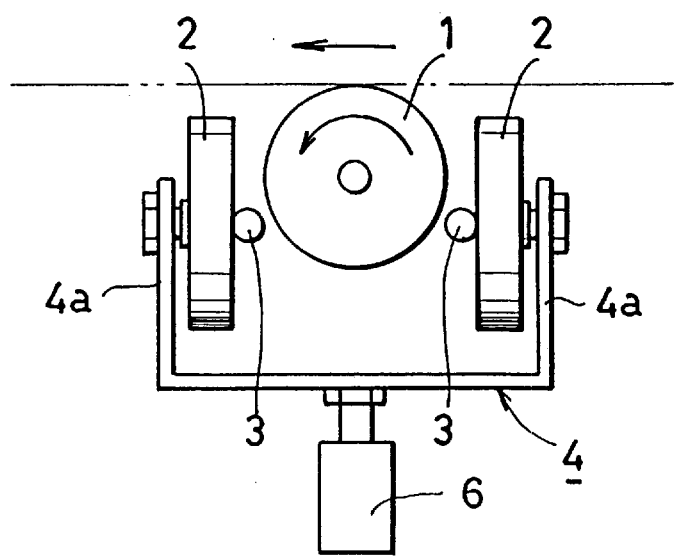
FIG. 8 is a front view of the conveyance-direction switching device of FIG. 6, in which the transverse rollers are lowered.

FIG. 8 shows the lift 4 lowered by the cylinder 6. In this condition, the drive roller 1 and the auxiliary rollers 3 are separated, so that the rotation of the drive roller 1 is not transmitted to the auxiliary rollers 3. Also, the uppermost edges of the transverse rollers 2 are positioned below the uppermost edge of the drive roller 1, so that the objects carried by the roller conveyor are conveyed "as is" by the drive roller 1 in the direction indicated by the arrow.

When the drive roller 1 and the transverse rollers 2 come in direct contact with each other, as shown in FIG. 1, the friction between the two transmits the torque. Therefore, it is preferable that the end surfaces of the transverse rollers 2 are made of such material or provided with such surface processing that generates fairly high frictional resistance to the drive roller 1. On the other hand, when the auxiliary rollers 3 as shown in FIG. 6 is used, the auxiliary rollers 3 can be made of such material that generates fairly high resistance between the drive roller 1 and the transverse rollers 2, e.g., abrasion resisting rubber, so as to realize reliable power transmission. It is possible to replace the auxiliary rollers 3 as necessary.

The conveyance-direction switching devices described above may be used in a new roller conveyor as built-in features, but it is also possible to retrofit an existing roller conveyor with a lift having transverse rollers in a desired position. In this case, it is convenient if standardized devices are prepared according to the pitch and diameter of the drive roller and arranged at appropriate positions as necessary.

As seen from the above, according to the conveyance-direction switching device used in a roller conveyor of the present invention, the device that transversely diverts objects carried by the roller conveyor uses the torque of the existing roller conveyor as its power source. Accordingly, such a device can be made at low cost. Moreover, because it does not require a separate power transmission mechanism, the whole structure can be made simple, and the device is easily fitted to an existing roller conveyor line.

Furthermore, the present invention makes it possible to divert the carried objects transversely, i.e., precisely at right angles, with respect to the conveyor line. Only the auxiliary rollers can be made of a material that has high frictional resistance in order to achieve reliable power transmission. For maintenance, the auxiliary rollers may be replaced separately.

Furthermore, according to the present invention, several transverse rollers mounted on a single lift are rotationally driven at several drive-roller positions. Therefore, a conveyance-direction switching device that reliably diverts the carried objects transversely can be easily realized.

What is claimed is:

1. A conveyance-direction switching device in a roller conveyor, comprising vertically movable transverse rollers that are provided below a rotationally driven drive roller and each having a rotational axis set in a direction intersecting with an axis of said drive roller, wherein part of each of said transverse rollers at a raised position thereof comes into contact with said drive roller and is rotationally driven, and an uppermost edge of each of said transverse rollers projects above an uppermost edge of said drive roller so as to transversely divert objects being conveyed.

2. A conveyance-direction switching device in a roller conveyor, comprising auxiliary rollers provided parallel to a drive roller and arranged so as to come into contact with sides of transverse rollers which are orthogonal to said drive roller, wherein said auxiliary rollers and transverse rollers are raised and lowered together so that when said transverse rollers are raised, said auxiliary rollers come into contact with said drive roller which rotationally drives said transverse rollers via said auxiliary rollers, and uppermost edges of said transverse rollers project above uppermost edges of said drive roller and transversely divert objects being conveyed.

3. The conveyance-direction switching device according to claim 1, further comprising a lift on which a plurality of said transverse rollers are provided, wherein when said lift is raised, said transverse rollers are rotationally driven at a plurality of drive roller positions.

4. The conveyance-direction switching device according to claim 2, further comprising a lift on which said transverse rollers and said auxiliary rollers are provided, wherein when said lift is raised, said transverse rollers are rotationally driven at a plurality of drive roller positions.

* * * * *

UNITED STATES PATENT AND TRADEMARK OFFICE
CERTIFICATE OF CORRECTION

PATENT NO. : 6,382,393 B2  Page 1 of 1
DATED : May 7, 2002
INVENTOR(S) : Kazuo Itoh et al.

It is certified that error appears in the above-identified patent and that said Letters Patent is hereby corrected as shown below:

<u>Title page,</u>
Item [30], Foreign Application Priority Data, add:

-- Dec. 15, 1999   (JP) ……….. 11-355552 --

Signed and Sealed this

Tenth Day of August, 2004

JON W. DUDAS
*Acting Director of the United States Patent and Trademark Office*